(12) United States Patent
Tsaur et al.

(10) Patent No.: US 9,918,293 B2
(45) Date of Patent: Mar. 13, 2018

(54) PROXIMITY ALERT USING SIGNAL STRENGTH

(71) Applicant: Avago Technologies General IP (Singapore) Pte. Ltd., Singapore (SG)

(72) Inventors: Lih-Feng Tsaur, San Diego, CA (US); Angel Polo, Solana Beach, CA (US); Chikan Kwan, San Diego, CA (US); Erik John Rivard, San Diego, CA (US); Arthur Jin, San Diego, CA (US); Xin Tian, San Diego, CA (US); Chaojing Sun, San Diego, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 544 days.

(21) Appl. No.: 14/289,168

(22) Filed: May 28, 2014

(65) Prior Publication Data

US 2014/0357293 A1 Dec. 4, 2014

Related U.S. Application Data

(60) Provisional application No. 61/829,084, filed on May 30, 2013.

(51) Int. Cl.
| | |
|---|---|
| *H04W 64/00* | (2009.01) |
| *H04W 4/02* | (2018.01) |
| *H04W 4/00* | (2018.01) |

(52) U.S. Cl.
CPC ......... *H04W 64/00* (2013.01); *H04W 4/023* (2013.01); *H04W 4/008* (2013.01); *Y02B 60/50* (2013.01)

(58) Field of Classification Search
CPC ..... H04W 64/00; H04W 4/008; H04W 4/023; Y02B 60/50
USPC .............................................. 455/456.1–457
See application file for complete search history.

(56) References Cited

U.S. PATENT DOCUMENTS

| | | | |
|---|---|---|---|
| 2014/0113558 A1* | 4/2014 | Varoglu | H04W 12/08 455/41.2 |
| 2014/0307600 A1* | 10/2014 | Dumitrescu | H04W 52/0245 370/311 |

OTHER PUBLICATIONS

Bluetooth Special Interest Group, "Using Bluetooth Low Energy Wireless Technology Effectively," LE White Paper, Bluetooth SIG, Inc., Oct. 22, 2009, 18 pages.

(Continued)

*Primary Examiner* — Marcus Hammonds
(74) *Attorney, Agent, or Firm* — Foley & Lardner LLP

(57) ABSTRACT

A monitoring device may monitor its proximity to a monitored station. The monitored station may transmit a proximity indicator to the monitoring device. For example, the proximity indicator may include the received signal strength of a signal sent by the monitored station. Wireless interface control circuitry at the monitoring device may monitor the status of the proximity indicator for changes. If one or more criteria set by an application processor are met by a detected change, the wireless interface control circuitry may send a status update to the application processor. In the criteria are not met, generation of the status update may be forgone. The application processor need not monitor the proximity indicator status and may remain in a reduced power consumption mode for longer periods.

19 Claims, 5 Drawing Sheets

(56) References Cited

OTHER PUBLICATIONS

Bluetooth Special Interest Group, Specification of the Bluetooth System—Master Table of Contents & Compliance Requirements, Covered Core Package version: 4.0, Bluetooth SIG, Inc., Jun. 30, 2010, 2302 pages.

* cited by examiner

PROXIMITY ALERT USING SIGNAL STRENGTH

I. CROSS REFERENCE TO RELATED APPLICATIONS

This application claims priority to provisional application Ser. No. 61/829,084, filed 30 May 2013, which is incorporated by reference in its entirety.

II. TECHNICAL FIELD

This disclosure relates to wireless communication, and proximity monitoring.

III. BACKGROUND

Rapid advances in electronics and communication technologies, driven by immense customer demand, have resulted in the widespread adoption of mobile communication devices. The extent of the proliferation of such devices is readily apparent in view of some estimates that put the number of wireless subscriber connections in use around the world at over 85% of the world's population. Improvements in wireless communication devices will help continue to make such devices attractive options for the consumer.

DETAILED DESCRIPTION

The discussion below focuses on generating proximity alerts at control circuitry based on signal strength monitoring. The control circuitry may be wireless interface controller circuitry in a mobile phone or any other device. In some cases, a monitored station, such as a mobile device, peripheral, other user equipment, may transmit a signal and the proximity of the monitored station may be monitored using the transmitted signal. For example, the monitoring device may determine the proximity of the monitored station by monitoring the strength, e.g., via a received signal strength indicator (RSSI), of the transmitted signal. Updates to the proximity status of the monitored station may be generated at the control circuitry. The control circuitry may refrain from sending updates to processing circuitry, e.g., an application processor, in the monitoring device depending upon whether update criteria are met for sending the status updates. For example, the control circuitry may refrain from sending updates unless a proximity state of the monitored station changes. In some cases, meeting the criteria means that the monitored signal strength has crossed one or more thresholds. For example, to meet one example criterion the monitored signal strength may undergo a change greater than the difference of two thresholds. The criteria may be set by the processing circuitry, e.g., the application processor. Refraining from sending status updates to the application processor that do not meet the criteria may allow the application processor to remain in a reduced power consumption mode for longer periods. Accordingly, the techniques may help devices save power by reducing instances of the power consumption that accompanies the application processor exiting the reduced power consumption mode, taking any associated actions, and returning to the reduced power consumption mode.

The discussion below makes reference to User Equipment (UE). UE may take many different forms and have many different functions. As one example, UE may be a 2G, 3G, or 4G/LTE cellular phone capable of making and receiving wireless phone calls, and transmitting and receiving data. The user equipment may also be a smartphone that, in addition to making and receiving phone calls, runs any number or type of applications. UE may be virtually any device that transmits and receives information, including as additional examples a driver assistance module in a vehicle, an emergency transponder, a pager, a satellite television receiver, a networked stereo receiver, a computer system, music player, or virtually any other device. The techniques discussed below may also be implemented in a base station or other network controller that communicates with the UE.

Figure 1:
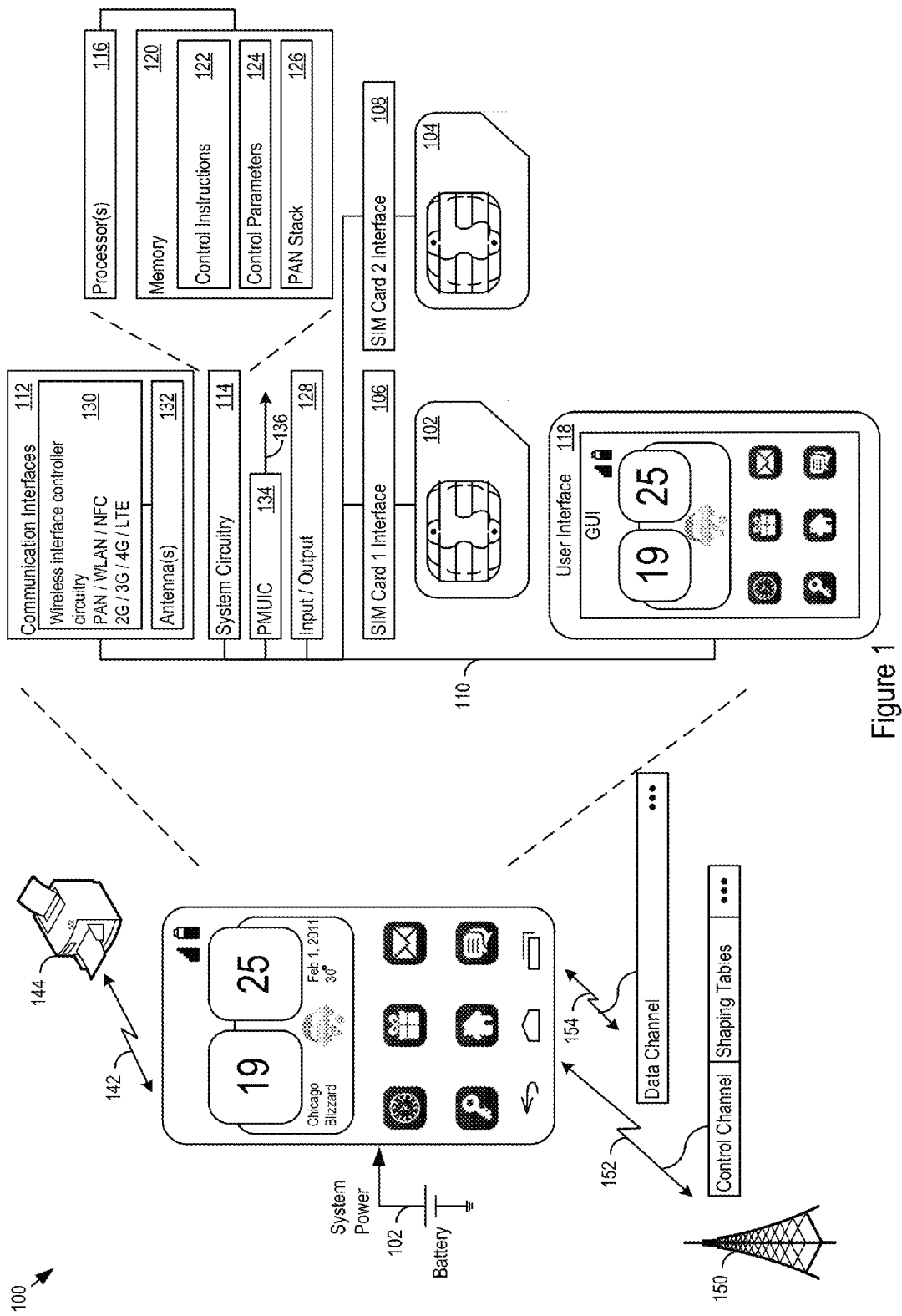
FIG. 1 shows an example of user equipment.

FIG. 1 shows an example of UE 100 that may include wireless communication, including personal area network (PAN) transceivers, such as Bluetooth and Bluetooth Low Energy transceivers. In this example, the UE 100 supports one or more Subscriber Identity Modules (SIMs), such as the SIM1 102 and the SIM2 104. An electrical and physical interface 106 connects SIM1 102 to the rest of the user equipment hardware, for example, through the system bus 110. Similarly, the electrical and physical interface 108 connects the SIM2 to the system bus 110.

As one example, UE may be a 2G, 3G, or 4G/LTE cellular phone capable of making and receiving wireless phone calls, and transmitting and receiving data using 802.11 a/b/g/n/ac/ad ("Wi-Fi"), Bluetooth (BT), Near Field Communications (NFC), or any other type of wireless technology. The UE may also be a smartphone that, in addition to making and receiving phone calls, runs any number or type of applications. UE may, however, be virtually any device that transmits and receives information, including as additional examples a driver assistance module in a vehicle, an emergency transponder, a pager, a satellite television receiver, a networked stereo receiver, a computer system, music player, or virtually any other device.

FIG. 1 shows an example of the UE 100 in communication with a network controller 150, such as an enhanced Node B (eNB) or other base station. The network controller 150 and UE 100 establish communication channels such as the control channel 152 and the data channel 154, and exchange data. In this example, the UE 100 supports one or more Subscriber Identity Modules (SIMs), such as the SIM1 102 and the SIM2 104. Electrical and physical interfaces 106 and 108 connect SIM1 102 and SIM2 104 to the rest of the user equipment hardware, for example, through the system bus 110.

The UE 100 includes communication interfaces 112, system circuitry 114, and a user interface 118. The system circuitry 114 may include any combination of hardware, software, firmware, or other logic. The system circuitry 114 may be implemented, for example, with one or more systems on a chip (SoC), application specific integrated circuits (ASIC), discrete analog and digital circuits, and other circuitry. The system circuitry 114 is part of the implementation of any desired functionality in the UE 100. In that regard, the system circuitry 114 may include logic that facilitates, as examples, decoding and playing music and video, e.g., MP3, MP4, MPEG, AVI, FLAG, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 118.

The user interface 118 and the input/output (I/O) interfaces 128 may include a graphical user interface, touch sensitive display, voice or facial recognition inputs, buttons, switches, speakers and other user interface elements. Additional examples of the I/O interfaces 128 include microphones, video and still image cameras, temperature sensors, vibration sensors, rotation and orientation sensors, headset and microphone input/output jacks, Universal Serial Bus (USB), Serial Advanced Technology Attachment (SATA), and Peripheral Component Interconnect express (PCIe) interfaces and connectors, memory card slots, radiation sensors (e.g., IR or RF sensors), and other types of inputs. The I/O interfaces 128 may further include Universal Serial Bus (USB) interfaces, audio outputs, magnetic or optical media interfaces (e.g., a CDROM or DVD drive), network (e.g., Ethernet or cable (e.g., DOCSIS) interfaces), or other types of serial, parallel, or network data interfaces.

The system circuitry 114 may include one or more processors 116 and memories 120. The memory 120 stores, for example, control instructions 122 that the processor 116, may include an application processor and executes to carry out desired functionality for the UE 100. The control parameters 124 provide and specify configuration and operating options for the control instructions 122. The UE 100 may include a power management unit integrated circuit (PMUIC) 134. In a complex device like a smartphone, the PMUIC 134 may be responsible for generating as many as thirty (30) different power supply rails 136 for the circuitry in the UE 100. As will be explained in more detail below, the memory 120 may also store a PAN stack 126. The control parameters 124 may be user configurable and may include, as examples: Mode, signal strength thresholds, and error rate thresholds, including low and high thresholds. The PAN wireless network interface controller may be used to establish a communication channel 142 with a peripheral device 144 or other PAN network device. A signal strength associated with the communication channel may be monitored to determine a proximity to the peripheral device 144 as a monitored station.

In the communication interfaces 112, the wireless interface controller circuitry 130 handles transmission and reception of signals through one or more antennas 132. The communication interface 112 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 112 may include transceivers that support transmission and reception under the 2G, 3G, BT, Wi-Fi, Universal Mobile Telecommunications System (UMTS), High Speed Packet Access (HSPA)+, and 4G/Long Term Evolution (LTE) standards. The techniques described below, however, are applicable to other wireless communications technologies whether arising from the 3rd Generation Partnership Project (3GPP), GSM Association, 3GPP2, IEEE, or other partnerships or standards bodies. As one specific example, the communication interface 112 may support transmission and reception under the Bluetooth and Bluetooth Low Energy (BLE) standards. The techniques described below, however, are applicable to other communications technologies.

As implementation examples, the communication interface 112 and system circuitry 114 may include BCM43341, BCM20702 or BCM4335 Bluetooth solutions, a BCM2091 EDGE/HSPA Multi-Mode, Multi-Band Cellular Transceiver and a BCM59056 advanced power management unit (PMU), controlled by a BCM28150 HSPA+ SoC baseband smartphone processer or a BCM25331 Athena (™) baseband processor. These devices or other similar system solutions may be extended as described below to provide the additional functionality described below. These integrated circuits, as well as other hardware and software implementation options for the user equipment 100, are available from Broadcom Corporation of Irvine Calif.

The control instructions 122 may be implemented in firmware, in an application executed by the processor 116, or in other manners. The controller circuitry 130 may monitor the proximity of the monitored station. The controller circuitry 130 may refrain from sending status updates to application processor unless the one or more criteria set by the application processor are met.

The control circuitry may perform monitoring for proximity, which may reduce the monitoring device's power consumption. When this technique is implemented, the control circuitry monitors (e.g., continuously, periodically, or at selected times) the signal strength of a connection to neighboring advertising devices. The controller circuitry may send an alert to the application processor when the signal strength drops to or below certain threshold or when the signal strength increases to or above a certain level. This feature may reduce wake up frequency for reading the measured signal strength values from the controller. Reduced application processor activity may reduce power consumption within the monitoring device.

Figure 2:
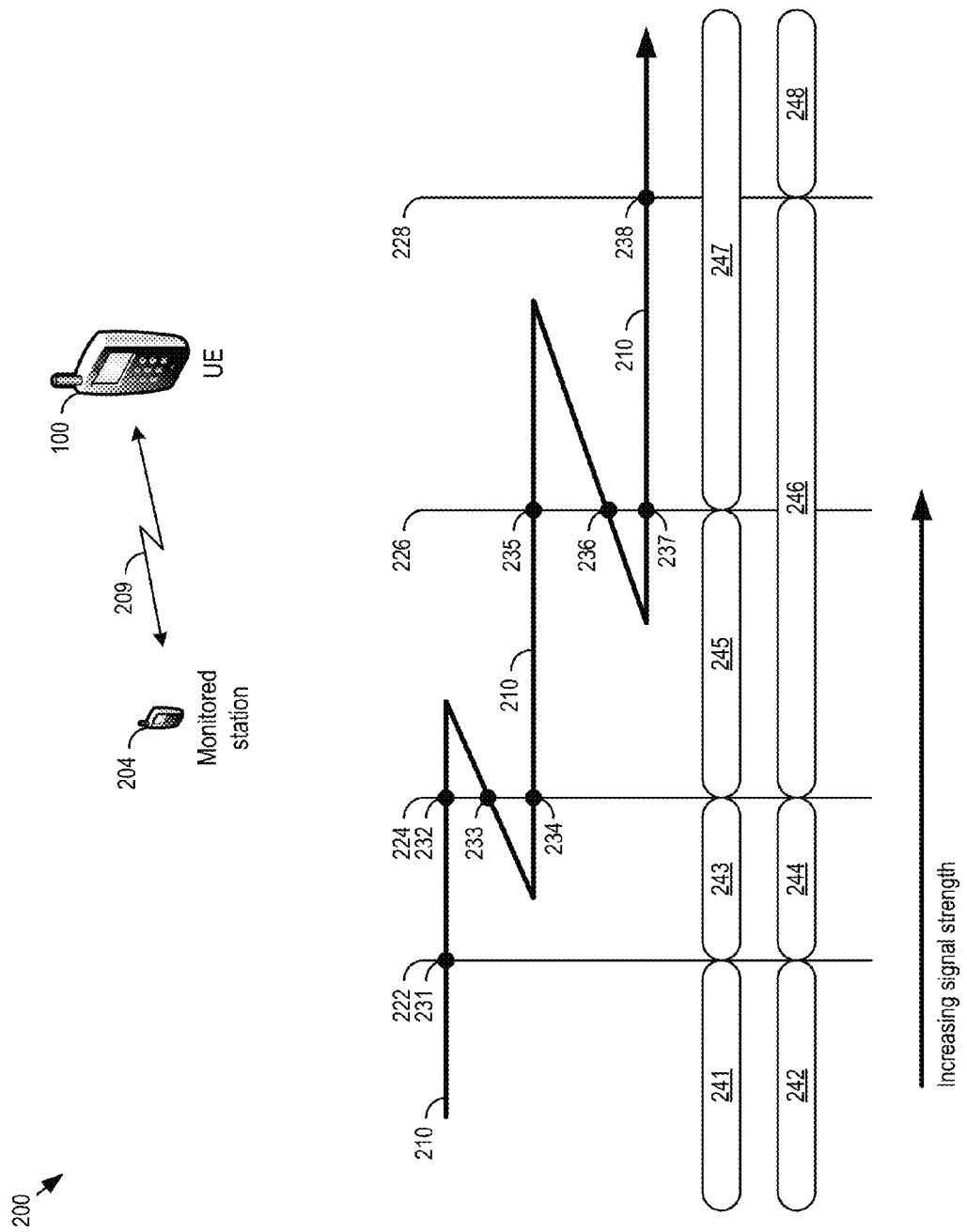
FIG. 2 shows an example proximity monitoring environment.

FIG. 2 shows an example proximity monitoring environment 200. In the example environment 200 a UE 100 monitors its proximity to a monitored station 204. The signal strength 210 of a signal 209 from the monitored station 204 is used by the UE 100 to determine its proximity to the monitored station 204. The signal strength 210 may be measured by wireless interface controller circuitry 130 in the UE 100. The wireless interface controller circuitry 130 may compare the measured signal level to thresholds, e.g., the thresholds 222, 224, 226, 228. The thresholds may correspond to criteria set by the application processor (for example, processor(s) 116) or stored and retrieved from memory. The wireless interface controller circuitry 130 may issue status updates when the thresholds 222, 224, 226, 228 are crossed. For example, status updates may be issued at crossings 231, 232, 233, 234, 235, 236, 237, 238.

In some cases, to avoid sending multiple updates of successive crossings of a single threshold, a reduced number (e.g., one update) of updates may be sent for successive crossings. Further updates may be withheld until a second threshold is crossed. Referring again to FIG. 2, in some cases, a status update may not be issued for crossings 233, 234, 236, and 237 because they are successive consecutive crossings of a single threshold.

Additionally or alternatively, ranges 241, 242, 243, 244, 245, 246, 247, 248 may be defined for the signal strength. Transitions between ranges may correspond to thresholds 222, 224, 226, 228. Ranges for increasing signal strength 241, 243, 245, 247 may differ from those for decreasing signal strength. Thresholds need not correspond to range transitions for increasing and decreasing signal strength. In the example environment 200 shown, thresholds 222, 224, and 226 corresponding to increasing signal strength range transitions, and thresholds 222, 224, and 228 correspond to decreasing signal strength range transitions. Threshold 222 corresponds the transition between ranges 241 and 242 and also corresponds to the transition between ranges 222 and 224. Threshold 222 corresponds the transition between ranges 241 and 243 and also corresponds to the transition between ranges 242 and 244. Threshold 224 corresponds the transition between ranges 243 and 245 and also corresponds to the transition between ranges 224 and 226. Threshold 226 corresponds the transition between ranges 245 and 247.

Threshold 2228 corresponds the transition between ranges 246 and 248. In some implementations, status updates may be issued when a threshold crossing corresponds to a range transition. For example, status updates may be issued for crossings 231, 232, 234, 235, and 237, because these threshold crossings occur at transitions for increasing signal strength and occur while the signal strength 210 is increasing. In the example, a status update may be issued for crossing 233, because this threshold crossing occurs at a transition for decreasing signal strength and occurs while the signal strength 210 is decreasing. Generation of status updates for crossings 236 and 238 may be forgone, because crossing 236 corresponds to a signal strength decrease at a range transition for increasing signal strength, and crossing 238 corresponds to a signal strength increase at a range transition for decreasing signal strength.

In some implementations, filtering (e.g. refraining from sending updates that do not meet the criteria) may be implemented for successive crossings and range transitions. In the example environment 200, status updates may be issued for crossings 231, 232, and, 235. Status updates may be forgone for crossings 233, 234, 236, 236, and 238.

The criteria, e.g., thresholds and ranges, may be set by the application processor. For example, the application processor may set the criteria and then enter a reduced power consumption mode. Then, the application processor may be brought out of the reduced power consumption mode for purposes of proximity monitoring when a status update is generated by the control circuitry. Thus, the application processor need not consume increased power when small changes, e.g., those that do not meet the criteria, occur within the proximity indicator. Rather, the small changes may be detected and filtered by the controller circuitry. The application processor may set the ranges based on programmed settings, operator input, application settings, or other input parameters. In some implementations, the application processor may set the criteria once and then enter the reduced power consumption mode multiple times without resetting the criteria. In some cases, wireless control circuitry may be configured to filter status updates regardless of the mode of the application processor.

Figure 3:
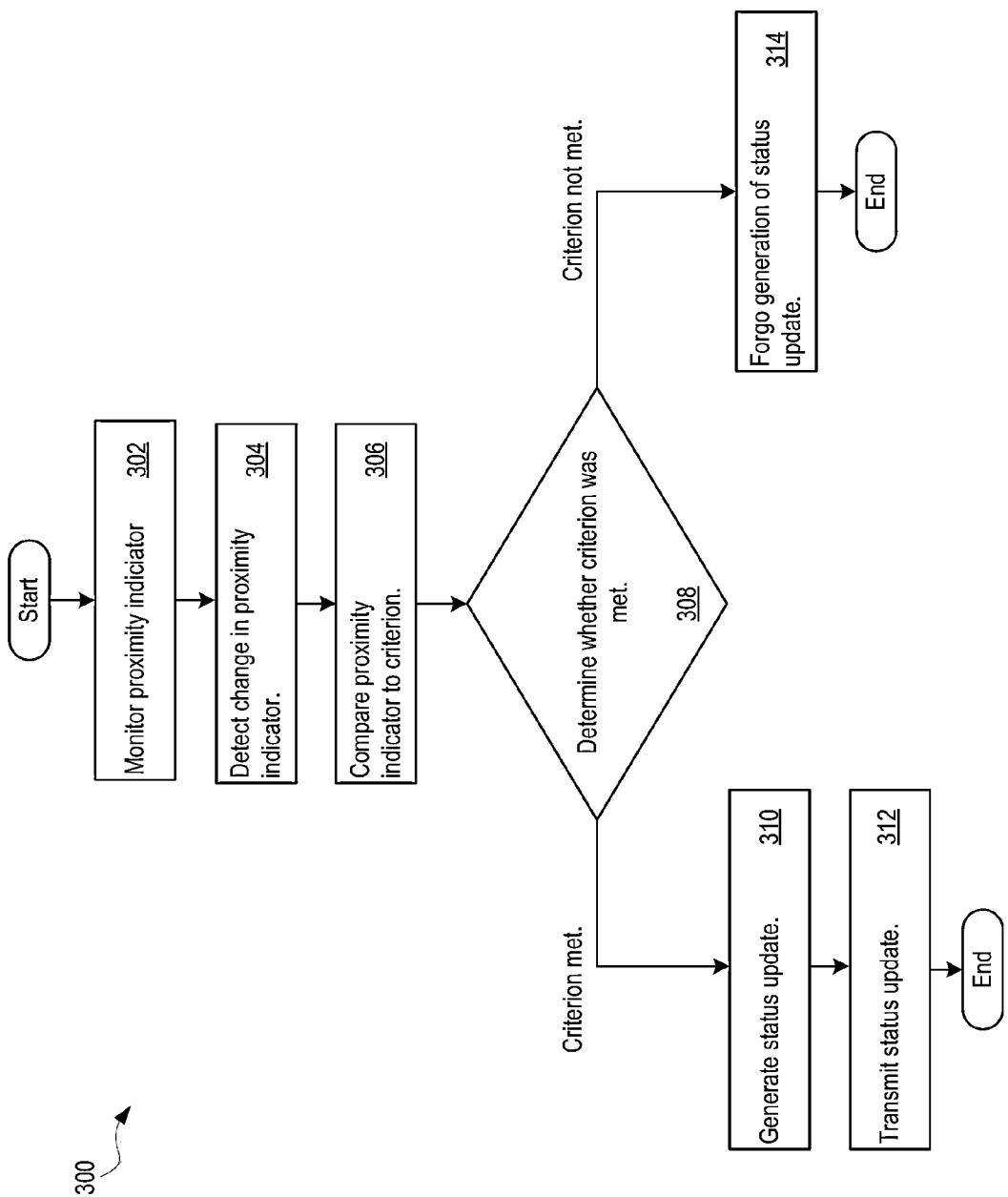
FIG. 3 shows example logic for status update filtering.

FIG. 3 shows example logic 300 for status update filtering. The example logic may be implemented in the controller circuitry of a monitoring device to filter status updates to an application processor of the monitoring device. A monitoring device may monitor an indication of its proximity to a monitored station (302). For example, the controller circuitry within the monitoring device may measure the signal strength of a one or more signals sent from the monitored station. In some cases, the signal may include an RSSI associated with an established Bluetooth channel between paired devices. In another example, the signal may include an advertising message from an advertising Bluetooth and/or BLE device. The logic 300 may detect a change in the proximity indicator (304). For example, the logic 300 may measure a change in the signal strength of the signal from the monitored station. Responsive to the detected change, the logic 300 compare the proximity indicator to a criterion (306). For example, the criterion may include a parameter set by an application processor. The criterion may include thresholds and/or power ranges for measured signal strength. For example, the thresholds and/or ranges discussed above with respect to FIG. 2 may be used. The logic 300 may determine if the proximity indicator has met the criterion (308).

If the criterion is met, the logic 300 may generate a status update (310). For example, the status update may include a signal strength measurement. When the criterion includes signal strength ranges, the status update may include an indication of a range transition. After generating the status update, the logic may send the status update (312).

If the criterion is not met, the logic may forgo generation of the status update (314). Refraining from sending the status updates may allow for power savings by reducing the instances in which the application processor exits the reduced power consumption mode. This may allow for power savings.

Various systems may implement different variations of the status update filtering feature. In a first example implementation, the wireless interface controller circuitry of the UE may include a BLE controller. The BLE controller may define, e.g., 3 threshold values with 3 alert types. In a second example implementation, the BLE controller may define 5 threshold values with 4 alert types. Other implementations are possible. In some example cases, the second implementation may be backward compatible with the first implementation, e.g., in Host-Controller Interface (HCl) of the BLE controller.

Any of the implementations, including the 3 threshold and 5 threshold implementations may include specified operating parameters such as:

User configurable parameters:
Mode: "Monitor RSSI for a link." or "Monitor RSSI for an advertising station." described below.
Alert Mask: E.g., a bit-mask configured to select one or all of the following types of alerts.
In-Range alert
Low alert
AlarmLow alert
High alert (for 5-threshold configuration)
Threshold values
Alarm low threshold
Low threshold
In-range (In-Range low) threshold
In-range high threshold (for 5-threshold configuration)
High threshold (for 5-threshold configuration)

The example BLE controllers using 3-threshold and 5-threshold configurations may implement multiple monitoring modes, e.g., Low energy (LE) RSSI monitoring of proximity for a Link, or LE RSSI monitoring of proximity for advertising stations, described below:

Low Energy RSSI Monitoring of Proximity for a Link

When the LE monitoring feature is active, the "Monitor RSSI for a Link" mode may be selected. The RSSI range information may be entered to establish the thresholds. The connection handle may be set. The LE connection may then be monitored for RSSI state changes. When the feature is disabled, the link controller may cease RSSI monitoring for proximity status.

LE connections may be configured individually. Multiple LE connections can be monitored simultaneously. When the monitored RSSI changes, the BLE controller monitoring the link may issue alerts, e.g., as noted below. When the feature is disabled, RSSI monitoring for proximity may be inactive. In some implementations, when the feature is re-enabled, the application processor may receive RSSI alerts from the BLE controller without the need to re-enter range information. After a link is disconnected or HCl_Reset command is issued, the connection handle and the RSSI range information may be cleared. The host may re-enter the information. In some cases, a HCl_Reset command may re-enable the feature.

Low Energy RSSI Monitoring of Proximity for Advertising Stations

When the LE monitoring feature is active, the "Monitor RSSI for All Non-connected Advertising Devices" mode may be selected. The RSSI range information may be entered to establish the thresholds. The advertising LE devices may then be monitored for RSSI state changes. When the feature is disabled, the link controller may cease RSSI monitoring for proximity status.

The host controller may maintain an advertising address list including station addresses, address types and RSSI states. The list size may be a configurable number, e.g., up to 32 or more. When the host controller receives an advertising packet, it will save the address and address type to the list if it is new, then obtain an RSSI reading. As RSSI changes, the BLE controller of the monitoring device may issue alerts, e.g., as noted below. When the feature is disabled, RSSI monitoring for proximity may be inactive. In some implementations, when the feature is re-enabled, the application processor may receive RSSI alerts from the BLE controller without the need to re-enter range information. The advertiser list need not be cleared after this feature is disabled. When the scan mode is disabled, the advertising address list may be cleared. When the scan mode is enabled, RSSI alerts may be issued as configured. A HCl_Reset command may be used to clear the advertising address list and the RSSI range information. After a link is disconnected or HCl_Reset command is issued, the scan mode may be disabled and the RSSI range information may be cleared. The host may re-enter the information and/or re-enable the scan mode.

RSSI Alerts

Figure 4:
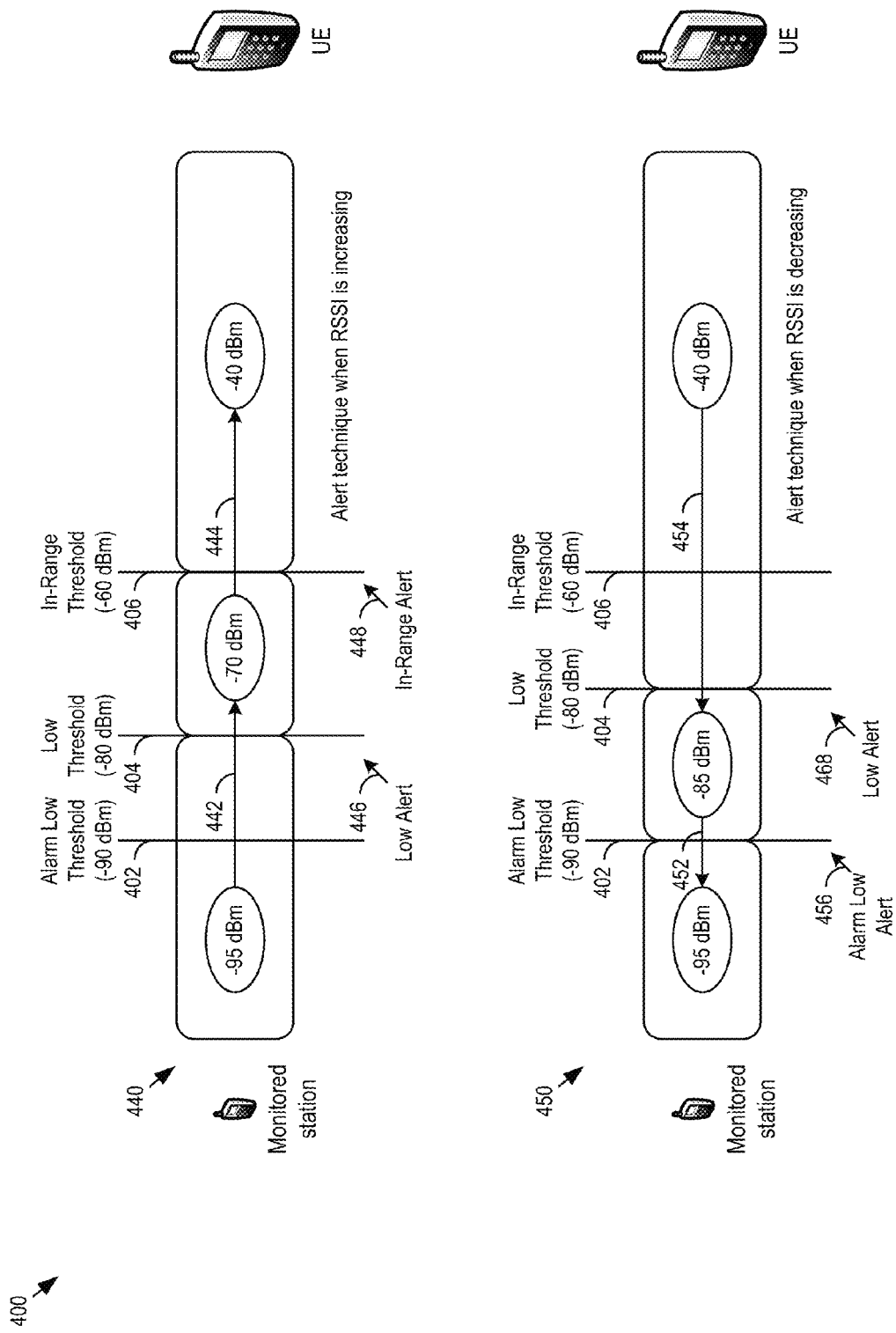
FIG. 4 shows an example Bluetooth low energy (BLE) system using three threshold values.

As noted above, one example implementation includes 3 threshold values with 3 alert types. FIG. 4 shows an example BLE system 400 using three threshold values 402, 404, 406. For the example BLE system 400, the RSSI for the monitored station is shown in two scenarios 440, 450. In the first scenario 440, the RSSI of the monitored station rises from −95 dBm to −40 dBm. The RSSI increases in two steps 442, 444. For this increase in RSSI two alerts 446, 448 are issued. Alerts are issued upon the RSSI crossing the Low threshold 404 and the In-Range threshold 406. An alert need not be issued at the Alarm Low threshold 402 because the system starts in the alarm low range. Alerts may be issued when a threshold crossing indicates a change in the range of the RSSI. As discussed above, a change larger than a difference in thresholds may cause an alert to be issued.

In the second scenario 450, the RSSI of the monitored station decreases from −40 dBm to −95 dBm. The RSSI increases in two steps 452, 454. For this increase in RSSI two alerts 456, 458 are issued. Alerts are issued upon the RSSI crossing the Low threshold 404 and the Alarm Low threshold 406. An alert need not be issued at the In-Range threshold 406 because the system starts in the In-Range range.

Figure 5:
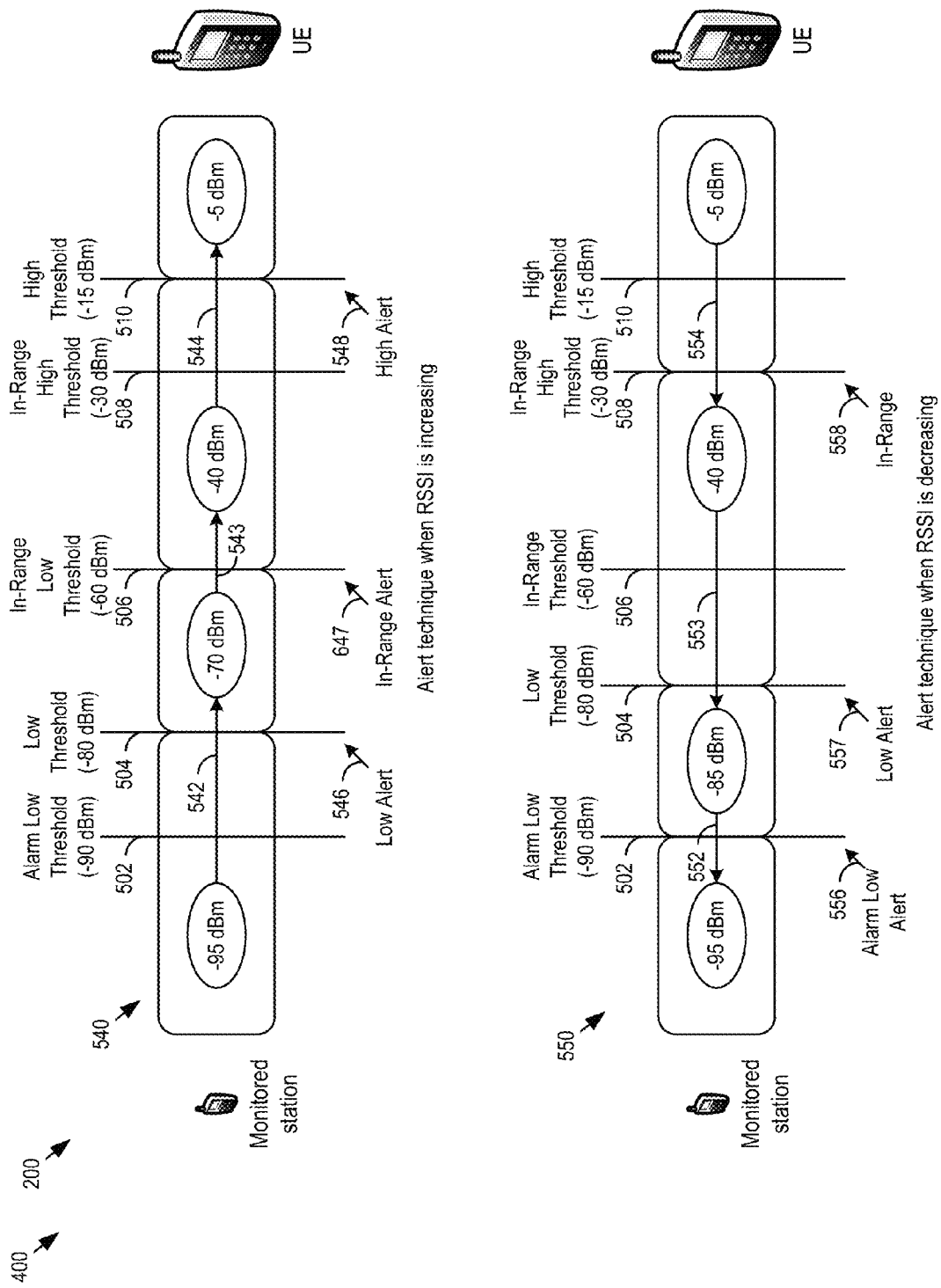
FIG. 5 shows an example BLE system using five threshold values.

As noted above, another example implementation includes 5 threshold values with 4 alert types. FIG. 5 shows an example BLE system 500 using five threshold values 502, 504, 506, 508, 510. For the example BLE system 500, the RSSI for the monitored station is shown in two scenarios 540, 550. In the first scenario 540, the RSSI of the monitored station rises from −95 dBm to −5 dBm. The RSSI increases in three steps 542, 543, 544. For this increase in RSSI three alerts 546, 547, 548 are issued. Alerts are issued upon the RSSI crossing the Low threshold 504, the In-Range Low threshold 506, and the High threshold 510. An alert need not be issued at the Alarm Low threshold 502 or the In-Range High Threshold 508 because the system starts in the alarm low range and is in the In-Range range when the In-Range High threshold 508 is crossed.

In the second scenario 550, the RSSI of the monitored station decreases from −5 dBm to −95 dBm. The RSSI increases in three steps 552, 553, 554. For this increase in RSSI three alerts 556, 557, 558 are issued. Alerts are issued upon the RSSI crossing the In-Range High Threshold 508, the Low threshold 504, and the Alarm Low threshold 502. An alert need not be issued at the High threshold 510 or the In-Range Low Threshold 506 because the system starts in the high range and is in the In-Range range when the In-Range Low threshold 506 is crossed.

Various implementations may be able to implement the three threshold configuration and the five threshold configuration. The active configuration may be set via the system parameters.

Host-Controller Interface

The host-controller interface (HCl) commands described below may be implemented to allow for enabling, disabling, and configuring some of the example BLE status update (or alert) filtering techniques discussed above. The example LE_ProximityAlert_Cfg3 (for 3-threshold configuration) or LE_ProximityAlert_Cfg5 (for 5-threshold configuration) commands may be used to select the parameters for interference reduction. The LE_Proximity Alert_Enable command may be used to enable or disable this LE feature. The numerical values and data widths may be used in some implementations. In various implementations, parameters, including numerical values and data widths, different from the example parameters listed below may be used.

Command: LE_ProximityAlert_Cfg3

Description

This HCl command is used to configure the RSSI monitor for Proximity feature with 3-threshold configuration.

Format

| Command | Sub OCF | Command Parameters | Return Parameters |
|---|---|---|---|
| LE_ProximityAlert_Cfg | A vendor specific opcode or one set by the standard body | Action, Mode, ConnHandle, Alert Mask, AlarmLow_Threshold, Low_Threshold, InRange_Threshold | Status, Action, [for "read" action: Mode, ConnHandle, Alert Mask, AlarmLow_Threshold, Low_Threshold, InRange_Threshold] |

Parameters

Action: 1 Octet

| Value | Description |
|---|---|
| 0x00 | Write the configuration |
| 0x01 | Read the configuration |

Mode: 1 Octet

| Value | Description |
|---|---|
| 0x01 | "Monitor RSSI for a Link" |
| 0x02 | "Monitor RSSI for Non_connected Advertising Devices" |

ConnHandle: 2 Octets

| Value | Description |
|---|---|
| 2 octets (e.g., 0x40) | Connection Handle for a Link, not used when Mode is for "Monitor RSSSI for Non-Connected Advertising Devices" |

Alert Mask: 1 Octet

| Value | Description |
|---|---|
| Bit 0 | "In-Range Alert" |
| Bit 1 | "Low Alert" |
| Bit 2 | "AlarmLow Alert" |

AlarmLow Threshold: 1 Octet

| Value | Description |
|---|---|
| 1 Octet (e.g., −70 dBm) | The lowest threshold (to trigger AlarmLow alert), value range: [−127, 20] |

Low Threshold (Legacy name: In-Range Threshold): 1 Octet

| Value | Description |
|---|---|
| 1 Octet (e.g., −50 dBm) | The low threshold (to trigger Low alert). This value is between AlarmLow and In-Range, value range: [−127, 20] |

InRange Threshold (Legacy name: High Threshold): 1 Octet

| Value | Description |
|---|---|
| 1 Octet (e.g., −30 dBm) | The highest threshold (to trigger In-Range alert), value range: [−127, 20] |

Return Parameters:
Status: 1 Octet

| Value | Description |
|---|---|
| 1 Octet | The status of the command, "success" (0x00) or an error code. |

Action: same description as in the command

When Action is "Read", the existing configuration is returned. Their descriptions are the same as in the command.

Command: LE_ProximityAlert_Cfg5 (5-threshold configuration)

Description

This HCl command may be used to configure the RSSI Proximity monitor.

Format

| Command | Sub OCF | Command Parameters | Return Parameters |
|---|---|---|---|
| LE_Proximity_Alert_Cfg5 | Vendor specific code or one set by a standard body | Action, Mode, ConnHandle, Alert Mask, AlarmLow_Threshold, Low_Threshold, InRangeLow_Threshold, InRangeHigh_Threshold, High_Threshold | Status [for "read" action: Mode, ConnHandle, Alert Mask, AlarmLow_Threshold, Low_Threshold, InRangeLow_Threshold, InRangeHigh_Threshold, High_Threshold] |

Parameters
Action: 1 Octet

| Value | Description |
|---|---|
| 0x00 | Write the configuration |
| 0x01 | Read the configuration |

Mode: 1 Octet

| Value | Description |
|---|---|
| 0x01 | "Monitor RSSI for a Link" |
| 0x02 | "Monitor RSSI for Non_connected Advertising Devices" |

Alert Mask: 1 Octet

| Value | Description |
|---|---|
| Bit 0 | "In-Range Alert" |
| Bit 1 | "Low Alert" |
| Bit 2 | "AlarmLow Alert" |
| Bit 3 | "High Alert" |

Connection Handle: 2 Octets

| Value | Description |
|---|---|
| 2 octets (e.g., 0x40) | Connection Handle for a Link, not used when Mode is "Monitor RSSI for Non-Connected Advertising Devices" |

AlarmLow Threshold: 1 Octet

| Value | Description |
|---|---|
| 1 Octet (e.g., −70 dBm) | The lowest threshold (to trigger AlarmLow alert), value range: [−128, 127] |

Low Threshold: 1 Octet

| Value | Description |
|---|---|
| 1 Octet (e.g., −50 dBm) | The low threshold (to trigger Low alert). This value is between AlarmLow and InRangeLow, value range: [−128, 127] |

InRangeLow Threshold: 1 Octet

| Value | Description |
|---|---|
| 1 Octet (e.g., −30 dBm) | The lower end of In-Range thresholds (to trigger In-Range alert). This value is between Low and InRangeHigh, value range: [−128, 127] |

InRangeHigh Threshold: 1 Octet

| Value | Description |
|---|---|
| 1 Octet (e.g., −30 dBm) | The higher end of In-Range thresholds (to trigger InRange alert). This value is between InRangeLow and High thresholds, value range: [−128, 127] |

High Threshold: 1 Octet

| Value | Description |
|---|---|
| 1 Octet (e.g., −30 dBm) | The highest threshold (to trigger High alert), value range: [−128, 127] |

Return Parameters:

Status: 1 Octet

| Value | Description |
|---|---|
| 1 Octet | The status of the command, "success" (0x00) or an error code. |

Action: same description as that for the command

When the executed Action is a "Read", the existing configuration is returned. The provided descriptions are the same as that for the command.

Command: LE_ProximityAlert_Enable

Description

This HCI command may be used to enable/disable the RSSI Proximity monitor.

Format

| Command | OCF | Command Parameters | Return Parameters |
|---|---|---|---|
| LE_ProximityAlert_Enable | Vendor Specific or set by standard body | Action | Status |

Parameters

Action: 1 Octet

| Value | Description |
|---|---|
| 0x00 | Disable the feature |
| 0x01 | Enable the feature |

Return Parameters

Status: Size: 1 Octet

| Value | Description |
|---|---|
| 1 Octet | The status of the command, "success" (0x00) or an error code. |

Event: LE RSSI Link Alert

Description

This HCl event sends a RSSI alert to the host device when the configured LE Proximity Monitor triggers an alert with a connected link Parameters.

Parameters

ConnHandle: 2 Octets

| Value | Description |
|---|---|
| 2 Octets | Connection Handle a LE link |

Alert_Type: 1 Octet

| Value | Description |
|---|---|
| 0x00 | "In-Range Alert" |
| 0x01 | "Low Alert" |
| 0x02 | "AlarmLow Alert" |
| 0x03 | "High Alert" (for 5-threshold configuration only) |

RSSI: 1 Octet

| Value | RSSI_dBm (1 octet) |
|---|---|
| a value in dBm | RSSI Reading |

LE RSSI Alert for an Advertising Device

Description

This HCl event sends a RSSI alert to the host device when the configured LE Proximity Monitor triggers an alert with in response to an Advertising device.

Parameters

ADV_Addr: 6 Octets

| Value | Description |
|---|---|
| 6 Octets | Address of the advertising device |

ADV_AddrType: 1 Octet

| Value | Description |
|---|---|
| 1 Octet | Address Type of the advertising device<br>0x00: Public Address<br>0x01: Random Address |

Alert_Type: 1 Octet

| Value | Description |
|---|---|
| 0x00 | "In-Range Alert" |
| 0x01 | "Low Alert" |
| 0x02 | "AlarmLow Alert" |
| 0x03 | "High Alert" (for 5-threshold configuration only) |

RSSI: 1 Octet

| Value | Description |
|---|---|
| a value in dBm | RSSI Reading in dBm |

In various implementations, other commands and command sequences may be used to enable, disable, and/or configure the features discussed above.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an ASIC, Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A method, comprising:
in a monitoring device:
    monitoring a proximity indicator at wireless interface controller circuitry, the proximity indicator indicative of proximity of the monitoring device to a monitored station different than the monitoring device;
    comparing the proximity indicator to a criterion set by an application processor in the monitoring device, the criterion comprising a threshold, wherein comparing the proximity indicator to the criterion comprises sending a single update for multiple successive crossings of the threshold;
    determining that the criterion is met when it is determined that the proximity indicator is increasing when the threshold is crossed;
    determining that the criterion is not met when it is determined that the proximity indicator is decreasing when the threshold is crossed;
    when the criterion is met:
        generating a status update based on the proximity indicator; and
        sending the status update from the wireless interface controller circuitry to the application processor; and
    when the proximity indicator fails to meet the criterion, forgoing generation of the status update.

2. The method of claim 1, wherein monitoring a proximity indicator comprises monitoring a signal strength.

3. The method of claim 2, wherein comparing the proximity indicator to the criterion comprises comparing the signal strength to a strength threshold.

4. The method of claim 1, further comprising, entering a reduced energy consumption mode at the application processor.

5. The method of claim 4, further comprising, responsive to the wireless interface controller sending the status update, exiting the reduced energy consumption mode.

6. The method of claim 1, further comprising determining when the proximity indicator is in one of multiple ranges based on the criterion.

7. The method of claim 6, wherein:
the threshold comprises a range transition between the multiple ranges.

8. The method of claim 1, further comprising detecting a change in the proximity indicator.

9. The method of claim 8, wherein comparing the proximity indicator to the criterion is responsive to detecting the change.

10. A device, comprising:
an application processor configured to set a criterion for sending a status update responsive to a proximity indicator; the proximity indicator indicative of proximity of the device to a monitored station different than the device, the criterion comprising a threshold; and
wireless interface controller circuitry, coupled to the application processor, the wireless interface controller circuitry configured to:
    monitor the proximity indicator;
    compare the proximity indicator to the criterion, wherein to compare the proximity indicator to the criterion comprises to send a single update for multiple successive crossings of the threshold;

determine that the criterion is met when it is determined that the proximity indicator is increasing when the threshold is crossed;

determine that the criterion is not met when it is determined that the proximity indicator is decreasing when the threshold is crossed;

when the criterion is met, create and send the status update to the application processor; and when the criterion is not met, forgo creation of the status update.

11. The device of claim 10, wherein the application processor is further configured to enter a reduced energy consumption mode after the criterion is set.

12. The device of claim 11, wherein the application processor is further configured to exit the reduced energy consumption mode responsive to the status update.

13. The device of claim 10, wherein:
the proximity indicator comprises a signal strength of a signal transmitted on an over-the-air channel between the monitored station and the device; and
the wireless interface circuitry comprises a detector configured to detect the signal strength.

14. The device of claim 10, wherein the wireless interface controller circuitry is further configured to detect a change in the proximity indicator.

15. The device of claim 14, wherein the wireless interface controller circuitry is further configured to compare the proximity indicator to the criterion responsive to the change.

16. A device, comprising:
an application processor configured to:
set a criterion comprising a first strength threshold and a second strength threshold different than the first strength threshold;
enter a reduced energy consumption mode after the criterion is set; and
exit the reduced energy consumption mode responsive to a status update being sent; and wireless interface controller circuitry, coupled to the application processor, the wireless interface controller circuitry configured to:
monitor a proximity indicator, the proximity indicator comprising a signal strength;
detect a change in the signal strength;
when the change in the signal strength is greater than a difference between the first and second thresholds, create and send the status update to the application processor; and
when the change in the signal strength is less than the difference between the first and second thresholds, forgo creation of the status update.

17. The device of claim 16, wherein:
the application processor is further configured to determine when the proximity indicator is in one of multiple states; and
the status update comprises an indication of a proximity state change.

18. The device of claim 16, where:
the criterion further comprises a third signal strength threshold; and
The wireless interface controller circuitry is configured to:
generate the status update with a first alert type when change in the signal strength is greater than the difference between first and second thresholds; and
generate the status update with a second alert type different from the first when change in the signal strength is greater than the difference between second and third thresholds.

19. The device of claim 16, where the signal strength comprises a signal strength of a signal transmitted on a wireless channel between a monitored station and the device.

* * * * *